(12) United States Patent
Loghin et al.

(10) Patent No.: US 12,132,601 B2
(45) Date of Patent: Oct. 29, 2024

(54) COMMUNICATION DEVICES AND METHODS

(71) Applicant: Sony Group Corporation, Tokyo (JP)

(72) Inventors: Nabil Sven Loghin, Stuttgart (DE); Stefan Uhlich, Stuttgart (DE); Kit Lam Lee, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 106 days.

(21) Appl. No.: 17/911,664

(22) PCT Filed: Feb. 19, 2021

(86) PCT No.: PCT/EP2021/054127
§ 371 (c)(1),
(2) Date: Sep. 15, 2022

(87) PCT Pub. No.: WO2021/190834
PCT Pub. Date: Sep. 30, 2021

(65) Prior Publication Data
US 2023/0140226 A1 May 4, 2023

(30) Foreign Application Priority Data
Mar. 24, 2020 (EP) .................................. 20165246

(51) Int. Cl.
*H04L 27/36* (2006.01)
*H04B 14/00* (2006.01)

(52) U.S. Cl.
CPC ......... *H04L 27/362* (2013.01); *H04B 14/004* (2013.01)

(58) Field of Classification Search
CPC ...... H04L 27/362; H04L 27/34; H04B 14/004
See application file for complete search history.

(56) References Cited

FOREIGN PATENT DOCUMENTS

CN 107425918 A 12/2017

OTHER PUBLICATIONS

Machine translation of KR-20200116803-A. (Year: 2020).*
Machine translation of FR-2773032-A1 (Year: 1999).*
International Search Report and Written Opinion mailed on Apr. 1, 2021, received for PCT Application PCT/EP2021/054127, filed on Feb. 19, 2021, 11 pages.
Grakhova et al., "The quadrature modulation of quaternion signals for capacity upgrade of high-speed fiber-optic wireless communication systems", Enhanced and Synthetic Vision 2003, Conference Enhanced and Synthetic Vision 2002, Proceedings of Spie, vol. 11146, 2018, pp. 11460C-1-11460C-7.
Linde et al., "A Multi-Dimensional Super-Orthogonal Modulation Alternative to M-QAM WCDMA for Next Generation Wireless Applications", IEEE Africon 2007, Sep. 1, 2007, pp. 1-9.
Zahra et al., "Performance Comparison of Digitized Quaternion Modulation with other Modulation Schemes", ITM Web of Conferences, DICTAP 2019, vol. 27, May 10, 2019, pp. 1-5.

* cited by examiner

*Primary Examiner* — Jean B Corrielus
(74) *Attorney, Agent, or Firm* — XSENSUS LLP

(57) ABSTRACT

According to an aspect of the present disclosure there is provided a communication device comprising circuitry configured to modulate a four-dimensional input signal by combining the four real-valued signal components of the input signal into a transformed signal and multiplying the transformed signal by carrier signals using two different carrier frequencies to obtain a transmit signal, and transmit the transmit signal.

19 Claims, 10 Drawing Sheets

BACKGROUND

BACKGROUND

BACKGROUND

BACKGROUND

COMMUNICATION DEVICES AND METHODS

CROSS-REFERENCE TO RELATED APPLICATIONS

The present application is based on PCT filing PCT/EP2021/054127, filed Feb. 19, 2021, which claims priorities to EP 20165246.8, filed on Mar. 24, 2020, the entire contents of each are incorporated herein by reference.

BACKGROUND

Field of the Disclosure

The present disclosure relates to communication devices and methods using a novel modulation scheme.

Description of Related Art

Quadrature Amplitude Modulation (QAM) has become one of the predominant modulation schemes used to improve spectral efficiency of both wired and wireless communications. In QAM, two real-valued signal components (either analog or digital) are transmitted over the same carrier frequency.

QAM is limited to only two components, generally called in-phase and quadrature components. Multi-dimensional QAM can be generated by artificially grouping several in-phase and quadrature components, e.g. grouping two QAM subcarriers of an OFDM, thereby generating a four-dimensional signal. Still, the underlying concept of QAM is based on only two signal components, using cosine and sine modulators.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to extend the concept of QAM.

According to an aspect there is provided a communication device comprising circuitry configured to
  modulate a four-dimensional input signal by combining the four real-valued signal components of the input signal into a transformed signal and multiplying the transformed signal by carrier signals using two different carrier frequencies to obtain a transmit signal, and transmit the transmit signal.

According to a further aspect there is provided a communication device comprising circuitry configured to
  receive a transmit signal, and
  demodulate the transmit signal into a four-dimensional output signal by multiplying the transmit signal by carrier signals using two different carrier frequencies to obtain a retransformed signal and decomposing the retransformed signal into the four real-valued signal components of the output signal.

According to still further aspects corresponding communication methods, a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication method, the disclosed computer program and the disclosed computer-readable recording medium have similar and/or identical further embodiments as the claimed communication devices and as defined in the dependent claims and/or disclosed herein.

The present disclosure presents a modulation scheme to transmit signals (analog or digital) via a new signal processing chain. It extends the concept of QAM, in which two signal components are transmitted via a cosine and sine wave of the same frequency. While QAM can be described in the complex domain (using real and imaginary numbers), the new scheme will process a four-dimensional signal. In an embodiment, quaternions (using real and three imaginary numbers) may be used to process and transmit the four independent signal components of the four-dimensional signal.

In an embodiment, two quaternions may be used in conjunction with two carrier frequencies at the transmitter side and at the receiver side. Frequency diversity can thus be exploited by the presented modulation scheme, since four independent signal components are spread over two frequency bands. Further, depending on the choice of the parameters of the modulation, e.g. of modulating quaternions, new four-dimensional constellations may be formed, allowing for spectral shaping to optimize the robustness of the signal.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
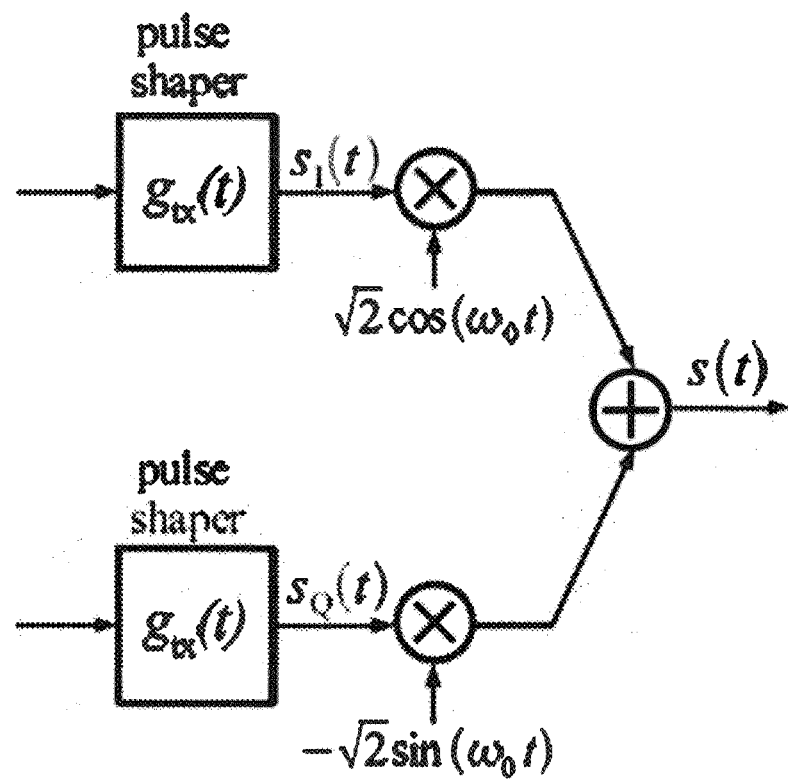
FIG. 1 shows a schematic diagram illustrating Quadrature Amplitude Modulation.

Referring now to the drawings, wherein like reference numerals designate identical or corresponding parts throughout the several views, FIG. 1 shows a schematic diagram illustrating Quadrature Amplitude Modulation (QAM). In QAM, two real-valued signal (either analog or digital) components are transmitted over the same carrier frequency $f_0=\omega_0/(2\pi c)$, where $\omega_0$ is called angular frequency. The signal on the upper branch is called in-phase component and is modulated by a cosine carrier of frequency $f_0$, whereas the signal on the lower branch is called quadrature-phase component and is modulated by a (negative) sine carrier of the same frequency $f_0$, (sine having a 90° phase shift compared to cosine in the mathematical sense, resulting in the name quadrature component). If the signal is digital, a pulse shaper may be needed to convert discrete-time, discrete-value (=digital) values to some analog signals $s_I(t)$ and $s_Q(t)$, resp. Pulse shapers may apply a certain filter $g_{tx}(t)$, e.g., a root-raised-cosine (RRC) filter, allowing both band-limited and inter-symbol-interference (ISI)-free signals (after matched filtering at receiver side, resulting in a raised cosine (RC) filter, which is ISI-free). The factors of $\sqrt{2}$ are used to normalize the signal power, but can be neglected in the following. The superposition (sum) of the two modulated signal components is transmitted as signal s(t). If the components $s_I(t)$ and $s_Q(t)$ are both bandlimited (with cutoff frequency $f_c$), then the signal components can be recovered at receiver side. Both components are transmitted within the same frequency band, centered around carrier frequency $f_0$.

Alternatively, the modulation from FIG. 1 can be described by complex numbers, where a complex input signal is formed: $s_{complex}(t)=s_I(t)+i^*s_Q(t)$, with $i=\sqrt{-1}$ being the imaginary unit of complex numbers. The up-conversion to carrier frequency $f_0$ is then described by multiplying $s_{complex}(t)$ with the complex phasor $e^{i\omega_0 t}$. Finally, the real-part of the signal needs to be considered as the transmit signal, i.e., $s(t)=\sqrt{2}*Re\{e^{i\omega_0 t}*s_{complex}(t)\}$, where the factor $\sqrt{2}$ has been used as normalization again. The receiver architecture will symmetrically apply this factor, such that an overall multiplication with a factor of 2 has been performed (otherwise, the receiver will lose half the signal power due to low-pass filtering).

QAM is limited to only two components. Multi-dimensional QAM can be generated by artificially grouping several in-phase and quadrature phase components, e.g. grouping two QAM subcarriers of an OFDM, thereby generating a four-dimensional signal. Still, the underlying concept of QAM is based on only two signal components, using cosine and sine modulators.

Figure 2:
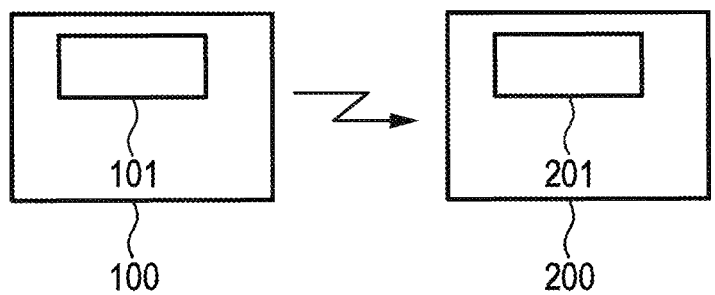
FIG. 2 shows a schematic diagram of first and second communication devices according to an aspect of the present disclosure.

The present disclosure proposes to extend the QAM concept. FIG. 2 shows a schematic diagram illustrating a (first) communication device 100 (e.g. an Access Point (AP)) according to an aspect of the present disclosure for communicating with, e.g. transmitting data to, another (second) communication device 200 (e.g. a station (STA)). Each of the communication devices 100, 200 comprises respective circuitry 101, 201 configured to perform particular operations. The circuitries may be implemented by a respective processor or computer, i.e. in hardware and/or software, or by dedicated units or elements. For instance, respectively programmed processors may represent the respective circuitries 101, 201.

According to the present disclosure the first communication device 100 comprises circuitry 101 configured to modulate a four-dimensional input signal by combining the four real-valued signal components of the input signal into a transformed signal and multiplying the transformed signal by carrier signals using two different carrier frequencies to obtain a transmit signal, and to transmit the transmit signal. The second communication device 200 comprises circuitry 201 configured to receive a transmit signal and to demodulate the transmit signal into a four-dimensional output signal by multiplying the transmit signal by carrier signals using two different carrier frequencies to obtain a retransformed signal and decomposing the retransformed signal into the four real-valued signal components of the output signal.

In an embodiment the QAM concept is extended to so-called quaternion based algebra. The resulting scheme will herein be denoted as Quaternion Amplitude Modulation, or Quat-AM in short. While complex numbers extend the (real) number space from a one-dimensional special unitary (SU(1)) group to a two-dimensional group (SU(2)), quaternions extend the number space to a four-dimensional special unitary (SU(4)) group: $x=x_0+\underline{x}=x_0+ix_1+jx_2+kx_3$, where $\square_0$ is the real part, and $\underline{x}$ is a pure quaternion (often expressed as 3D vector $\underline{x}=(x_1\ x_2\ x_3)^T$), consisting of three (independent) imaginary (fundamental quaternion) units i, j and k. $(\cdot)^T$ is the transpose operation, transforming a row vector into a column vector (or vice versa).

They define a (strict) skew field, in which basic rules apply, except multiplication not being commutative. The Hamilton product of two quaternions a, b is $a\cdot b=a_0\cdot b_0-(\underline{a},\underline{b})+a_0\underline{b}+b_0\underline{a}+\underline{a}\times\underline{b}$. Hereby, $a_0\cdot b_0-(\underline{a},\underline{b})+a_0\ \underline{b}+b_0\underline{a}$ is known from complex numbers ($(\underline{a},\underline{b})$ being the scalar product of $\underline{a}$ and $\underline{b}$) and $\underline{a}\times\underline{b}$ is the additional non-commutative complex part, expressed by a vector product.

Some further Quaternion basics are as follows:

$ijk=i^2=j^2=k^2=-1$ cyclic properties: $ij=k;jk=i;ki=j$ and $ji=-k;kj=-i;ik=-j$ norm: $|x|^2=x_0^2+x_1^2+x_2^2+x_3^2$ inverse:

$$x^{-1} = \frac{\bar{x}}{x\bar{x}} = \frac{\bar{x}}{|x|^2}$$

with Hermitian: $\bar{x} = x_0 - \underline{x}$

4D Cartesian to polar coordinates:
$x = x_0 + \underline{x} = x_0 + ix_1 + jx_2 + kx_3 = |x| \cdot (\cos \Phi + \in \sin \Phi)$
with $$\Phi = \arccos\left(\frac{\text{Re}\{x\}}{|x|}\right) \text{ and } \in = \text{Im}\{x\}/(|x| \cdot \sin\Phi) = \frac{\text{Im}\{x\}}{|\underline{x}|} = \frac{\underline{x}}{|\underline{x}|}$$

in general:

$$e^x = e^{x_0}\left(\cos|\underline{x}| + \frac{\underline{x}}{|\underline{x}|}\sin|\underline{x}|\right)$$

in particular for pure quaternions $\underline{\alpha}$, $\underline{\alpha}$, let $\underline{a} = \underline{\alpha}\omega_0 t$ with $\omega_0 t \in \mathbb{R}$ and $|\underline{\alpha}| = 1$ $$e^{\underline{a}} = \cos|\underline{a}| + \frac{\underline{a}}{|\underline{a}|}\sin|\underline{a}| = \cos\omega_0 t + \underline{\alpha} \cdot \sin\omega_0 t$$

Multiplying with this factor contribute to a rotation by $2 \cdot \omega_0 t$

Complete rotation by left and right sided multiplication, i.e.:

$x_{rotated} = e^{\underline{\alpha}} x e^{-\underline{\alpha}}$

In the following, a general quaternion rotation will be used, defined by $x_{rotated} = e^{\underline{\alpha}} x e^{\underline{b}}$ with $\underline{b}$ not necessarily $-\underline{\alpha}$ (in fact, this special case, will be excluded).

The idea of Quat-AM is to consider quaternion based algebra, to form a TX/RX architecture, allowing to transmit four independent, real-valued signal components. This will be illustrated in the following by way of several embodiments for TX and RX architectures. Subscripts (e.g. "01") indicate the description with two carrier frequencies $f_0$ and $f_1$, and various subtypes are denoted by different super-indices (e.g., "a" vs. "b" implementation).

Figure 3:
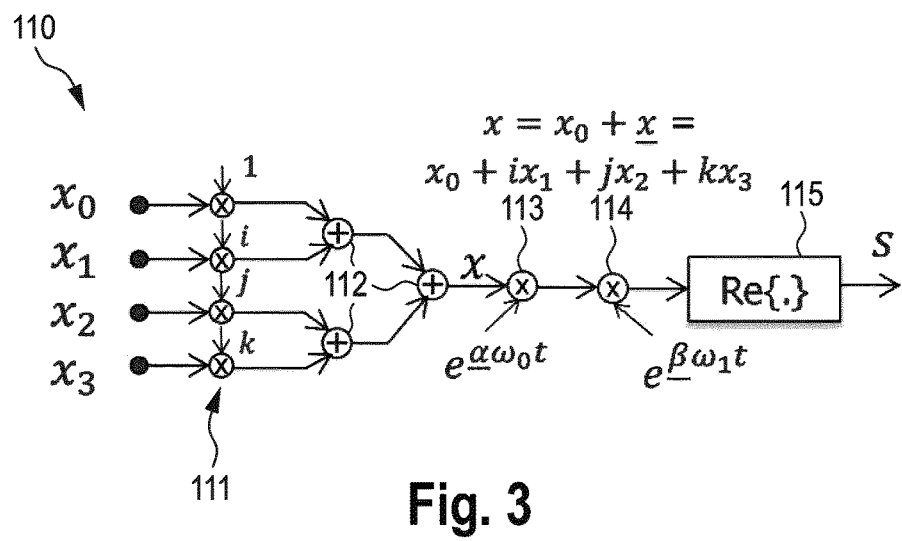
FIG. 3 shows a schematic diagram of an embodiment of a Quaternion Amplitude Modulation (Quat-AM) transmitter architecture according to the present disclosure.

FIG. 3 shows a schematic diagram of an embodiment of a Quat-AM transmitter 110 (i.e. of an embodiment of a first communication device 100 according to the present disclosure), also designated with $TX^a_{01,q}$, with four independent input signals $x_{0, \ldots, 3}$, all assumed to be bandlimited with cutoff frequency $f_c$. The signal x is obtained by grouping the real-valued inputs to one quaternion signal using multipliers 111 and adders 112. The upcoming multiplication with a quaternion phasor $e^{\underline{\alpha}\omega_0 t}$ is indicated by an arrow from left to (upper) right, meaning that the signal x is to be multiplied in a multiplier 113 from left-hand side with this phasor (the phasor itself is a quaternion). It shall be noted that multiplication in SU(4) is not commutative, i.e., for two quaternions a and b, a*b is not the same as b*a, due to the definition of the so called Hamilton product. The next multiplication with a quaternion phasor $e^{\underline{\beta}\omega_1 t}$ in a multiplier 114 is performed from right-hand side. Finally, a projection, using a real-part projector 115, towards the real part of the signal results in a real-valued signal s (having a physical representation, e.g. modulating an electromagnetic wave):

$s = \text{Re}\{e^{\underline{\alpha}\omega_0 t} \cdot x \cdot e^{\underline{\beta}\omega_1 t}\}$. Two frequencies $f_0$ and $f_1$ and two pure quaternions (with unit power) $\underline{\alpha}$ and $\underline{\beta}$ are used.

The transmit signal s consists of two spectra/bands, centered around the "sum and the difference frequencies" $\omega_\Sigma = \omega_0 + \omega_1$ and $\omega_\Delta = \omega_0 - \omega_1$. In both bands, all four signal components $x_{0 \ldots 3}$ are transmitted. This offers frequency diversity in frequency selective fading channels. In general, the presented communication devices and methods allow a novel way to apply channel bonding (if two channels at $\omega_\Sigma$ and $\omega_\Delta$ are to be grouped together, even when the bands are non-adjacent).

For the simple example of using $f_1 = 0$ Hz and $\underline{\alpha} = i$ (conventional imaginary unit), the output is a normal QAM. In this case, only $x_0$ and $x_1$ can be recovered at the receiver and the components $x_2$ and $x_3$ cannot be resolved (mathematically, the matrix Q shown below will have only rank two, i.e., only two independent rows/columns).

In summary, the following relationships and abbreviations hold:

$\omega_0 \geq \omega_1 \geq \omega_c$; define $\omega_\Sigma = \omega_0 + \omega_1$; $\omega_\Delta = \omega_0 - \omega_1$; $\omega_c$ being the cutoff frequency of an ideal lowpass filter $$Q = \begin{pmatrix} 1 + \epsilon^2 & & \\ -\epsilon\gamma_1 & & -\epsilon\gamma^T \\ -\epsilon\gamma_2 & \alpha\alpha^T + \beta\beta^T + \gamma\gamma^T & \\ -\epsilon\gamma_3 & & \end{pmatrix} \text{ with } Q' = (\alpha\alpha^T + \beta\beta^T + \gamma\gamma^T)$$

Figure 4:
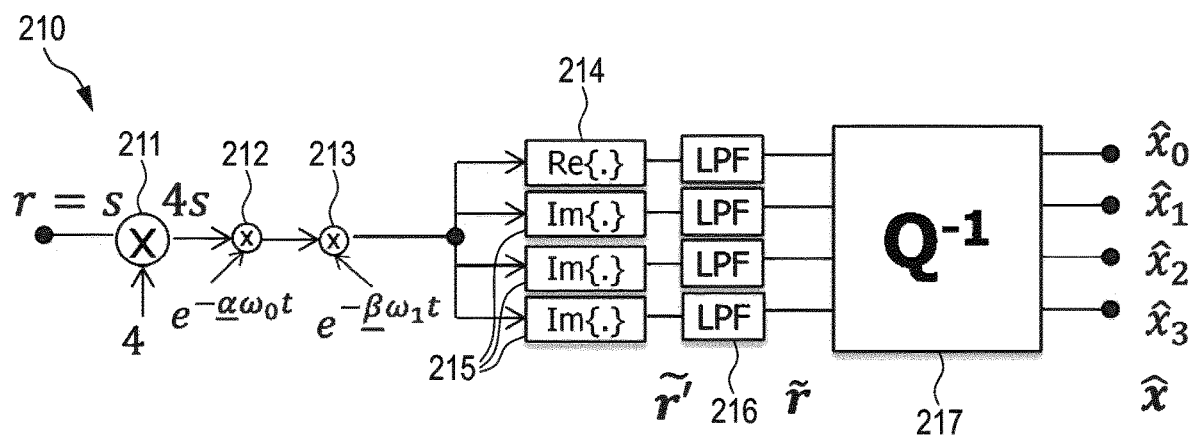
FIG. 4 shows a schematic diagram of an embodiment of a Quat-AM receiver architecture according to the present disclosure.

Q' being a unit dyadic forming matrix
$c_v = \cos(\omega_v t); s_v = \sin(\omega_v t); v \in \{0, 1\Delta, \Sigma\}; \underline{x} = (x_1 x_2 x_3)^T$
$s = \text{Re}\{e^{\underline{\alpha}\omega_0 t} \cdot x \cdot e^{\underline{\beta}\omega_1 t}\} = c_0 c_1 x_0 - s_0 c_1 \langle \underline{x}, \alpha \rangle - c_0 s_1 \langle \underline{x}, \beta \rangle - s_0 s_1 x_0 \in +s_0 s_1 \langle \underline{x}, \gamma \rangle$
$2s = x_0(c_\Delta + c_\Sigma) - \langle \underline{x}, \alpha \rangle (s_\Delta + s_\Sigma) + \langle \underline{x}, \beta \rangle (s_\Delta ' s_\Sigma) + \langle \underline{x}, \gamma \rangle (c_\Delta - c_\Sigma) - x_0 \in (c_\Delta - c_\Sigma) \rightarrow$ for $TX_{\Delta\Sigma}$ realization
$\alpha = (\alpha_1 \alpha_2 \alpha_3)^T; \beta = (\beta_1 \beta_2 \beta_3)^T; \gamma = (\gamma_1 \gamma_2 \gamma_3)^T = \alpha \times \alpha; \in = \langle \alpha, \beta \rangle = \Sigma_{v=1}^3 \alpha_v \beta_v; |\alpha| = |\beta| = 1$ FIG. 4 shows a schematic diagram of an embodiment of a Quat-AM receiver 210 (i.e. of an embodiment of a second communication device 200 according to the present disclosure), also designated with $RX^a_{01,q}$. The receiver 210 reverts the order, similar as in a conventional QAM. The factor of four (applied by a multiplier 211) is used for normalization (similar as $\sqrt{2} \cdot \sqrt{2} = 2$ for normal QAM, whereas Quat-AM requires twice the correction, i.e., $2 \cdot 2 = 4$). Then, multiplication with quaternion phasor $e^{-\underline{\alpha}\omega_0 t}$ and quaternion phasor $e^{-\underline{\beta}\omega_1 t}$ in multipliers 212 and 213 is applied. After projection to four dimensions by a real-part projector 214 and three imaginary-part projectors 215, a low pass filter (LPF) 216 may be used, similar as in conventional QAM, to remove unwanted images at higher frequencies. The matrix inversion of the four-dimensional square matrix Q is applied by a matrix inverter 217, since the four input signals $x_{0 \ldots 3}$ are combined during transmission and are not simply recovered by projection towards the four dimensions. The analysis assumes an ideal channel for ease of description, i.e., received signal r = s, without any distortions or noise.

Figure 5:
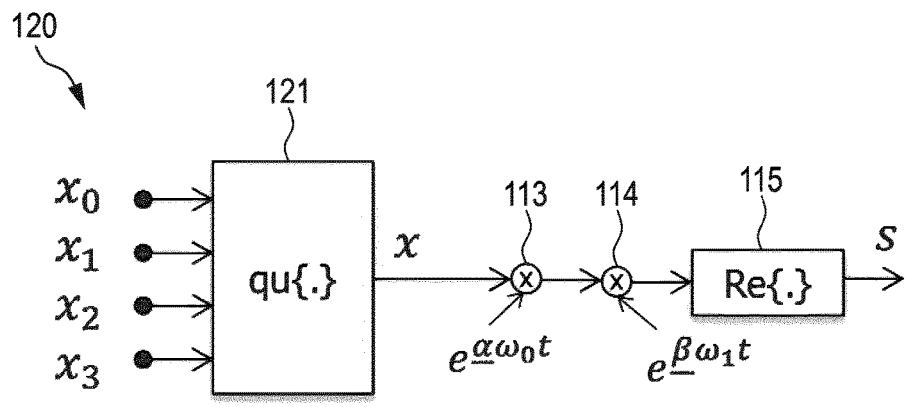
FIG. 5 shows a schematic diagram of another embodiment of a Quat-AM transmitter architecture according to the present disclosure.
Figure 6:
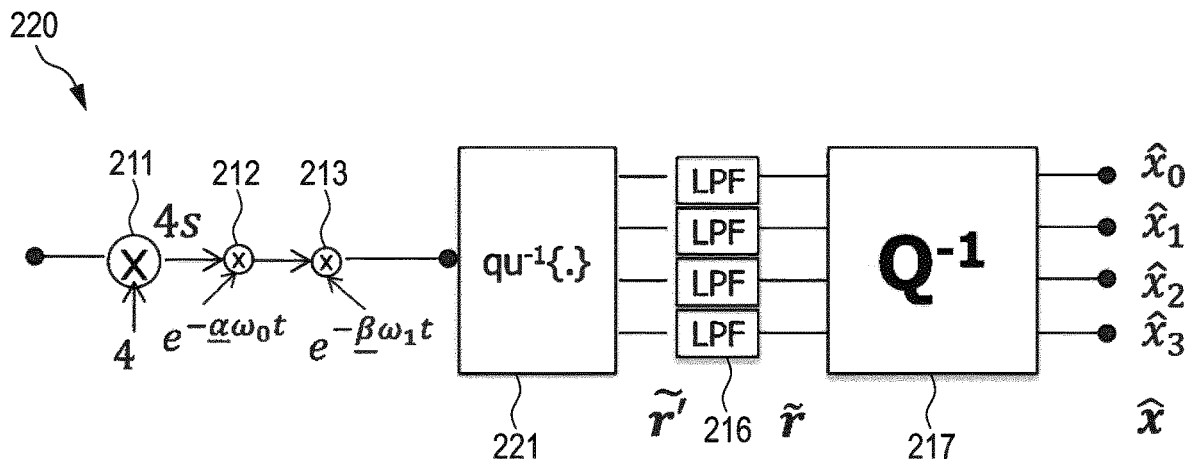
FIG. 6 shows a schematic diagram of another embodiment of a Quat-AM receiver architecture according to the present disclosure.

FIG. 5 shows a schematic diagram of another embodiment of a Quat-AM transmitter 120 (i.e. of an embodiment of a first communication device 100 according to the present disclosure), also designated with $TX^b_{01,q}$, using a quaternion assembler 121. FIG. 6 shows a schematic diagram of another embodiment of a Quat-AM receiver 220 (i.e. of an embodiment of a second communication device 200 according to the present disclosure), also designated with $RX^b_{01,q}$, using a quaternion disassembler 221.

In the following some comments on the choice of modulating quaternions $\underline{\alpha}$ and $\underline{\beta}$ are provided. It can be shown that $\underline{\alpha}$ and $\underline{\beta}$ must not be parallel, i.e., linear dependent. Otherwise, the four signal components cannot be fully recovered. For the special case of $\underline{\alpha}$ and $\underline{\beta}$ being orthogonal, it can further be shown that the Q matrix is the identity matrix, i.e., no matrix inversion is needed for such settings.

If $\underline{\alpha} \perp \underline{\beta}$, i.e., a and § being orthogonal, the unit dyadic forming matrix Q' will produce the identity matrix $I_3$ and thus $Q=I_4$. If $\alpha=\pm\beta$, then Q is singular, else regular (and can be inverted). For the ideal channel it holds: $\tilde{r}=r=s \rightarrow$ output $\hat{x}=Q^{-1}\,\tilde{r}=x$ (else potential noise enhancement). Instead of matrix inversion (=zero forcing), better methods are possible (ML, MMSE, . . . ).

A simple example is as follows:

$$\alpha = i\bigl(\alpha = (1, 0, 0)^T\bigr); \beta = j \rightarrow \gamma = k; \epsilon = 0; Q = I_4$$

$$2s = x_0(c_\Delta + c_\Sigma) - \langle \underline{x}, \alpha \rangle(s_\Delta + s_\Sigma) + \langle \underline{x}, \beta \rangle(s_\Delta - s_\Sigma) + \langle \underline{x}, \gamma \rangle(c_\Delta - c_\Sigma) - x_0\epsilon(c_\Delta - c_\Sigma) = x_0(c_\Delta + c_\Sigma) - x_1(s_\Delta + s_\Sigma) + x_2(s_\Delta - s_\Sigma) + x_3(c_\Delta - c_\Sigma)$$

The superimposed QAM structure then is:

$$P = \begin{pmatrix} 1 & 0 & 0 & 1 \\ 0 & 1 & -1 & 0 \\ 1 & 0 & 0 & -1 \\ 0 & 1 & 1 & 0 \end{pmatrix}.$$

Figure 7:
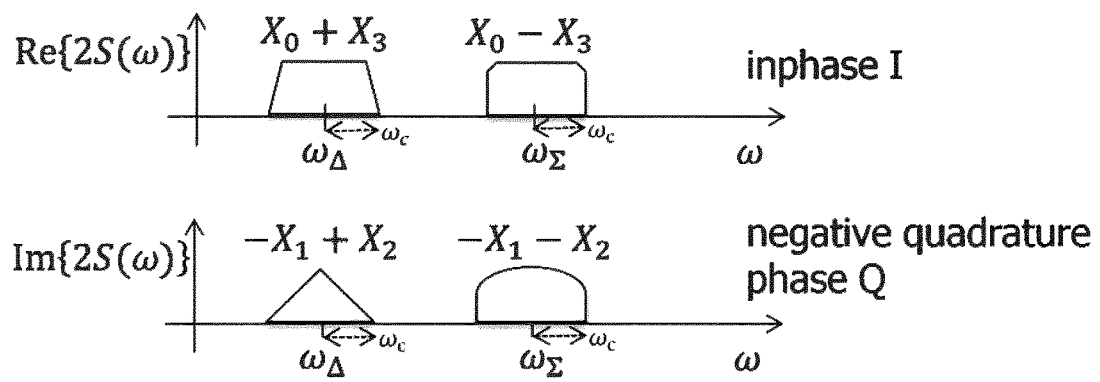
FIG. 7 shows diagrams illustrating the in-phase and the negative quadrature phase over frequency for the disclosed Quaternion Amplitude Modulation.

Then, QAM$\omega_\Delta$ uses I: $x_0+x_3$ and Q: $x_1-x_2$ and QAM$\omega_\Sigma$ uses I: $x_0-x_3$ and Q: $x_1+x_2$. This is illustrated in FIG. 7 showing diagrams illustrating the in-phase I and the negative quadrature phase Q over frequency.

The presented receiver architectures are linear receivers with suboptimum performance (but reduced complexity). Matrix inversion corresponds to zero forcing (ZF) detection, which would in general increase noise power. A better linear detector would be minimum mean squared error (MMSE), which in addition considers the noise statistics during linear matrix inversion. Optimum detection considers the full observation of the four-dimensional signal $\tilde{r}$ after low pass filtering, by performing maximum likelihood (ML) detection (i.e., $\tilde{r}$ is compared against all possible transmit permutations and the most likely one is chosen as estimation $\tilde{x}$). Other detectors may be considered as well, such as successive interference cancellation (SIC) or suboptimum ML detectors, such as sphere decoding.

In the following, the frequency constraints, e.g. allowing alias-free representations of the TX and RX signals, are discussed. Further, comments on the choice of the input signals $x_{0\,\ldots\,3}$ in case of digital modulation are provided. They can be e.g. simple BPSK signals (taking on either value $-1$ or $+1$ per component) or any other discrete real-valued signals.

In particular, the following holds for the frequency components (see also FIG. 7):
  $\omega_0 \geq \omega_c$ and $\omega_1 \geq \omega_c$
  $|\omega_0-\omega_1| \geq \omega_c$ to avoid aliasing in TX signal
  ideal LPF: 1 for $|\omega|<\omega_c$ and 0 for $|\omega|>\omega_{c,LPF} \geq 2\omega_1 - \omega_c$
  digital representation of Quat-AM
    TX side: max. freq. component at $\omega_{max,TX}=\Sigma+\omega_c$; min. sampling rate: $\omega_{s,TX} > 2\omega_{max,TX} = 2\Sigma+2\omega_c$
    RX side: max. freq. component at $\omega_{max,RX}=2\Sigma+\omega_c$; sampling rate: $\omega_{s,RX} > 2\omega_{max,RX} = 4\Sigma+2\omega_c$
    for simulations: constantly sample with $\omega_{s,RX}=4\Sigma+2\omega_c$ The input quaternion elements $x_i$ for digital communication are either generated by four independent PAMs, or by two QAM mappings, or by a four-dimensional QAM (or 3D+PAM). Further, the ML demapper should include P/T/Q matrix.

Figure 8:
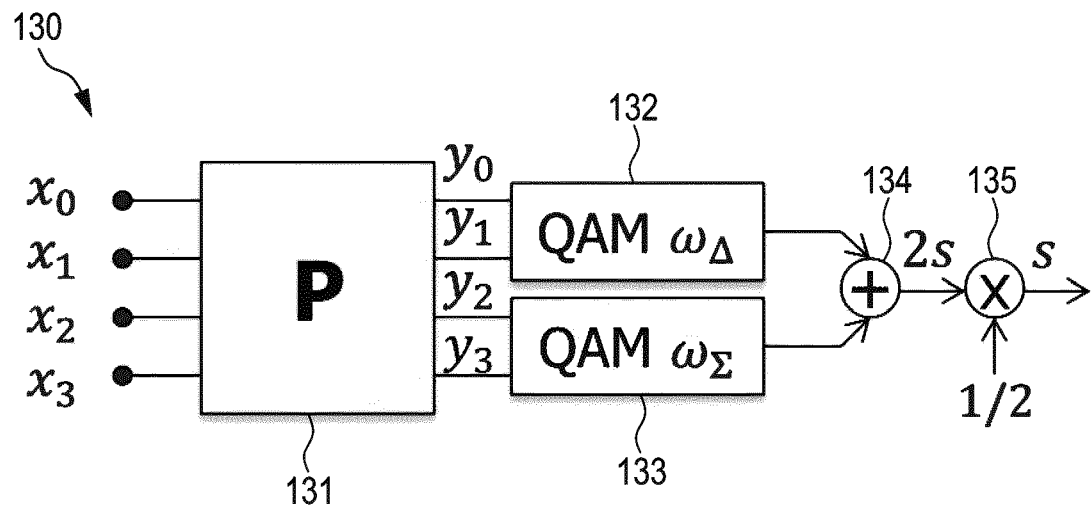
FIG. 8 shows a schematic diagram of another embodiment of a Quat-AM transmitter.
Figure 9:
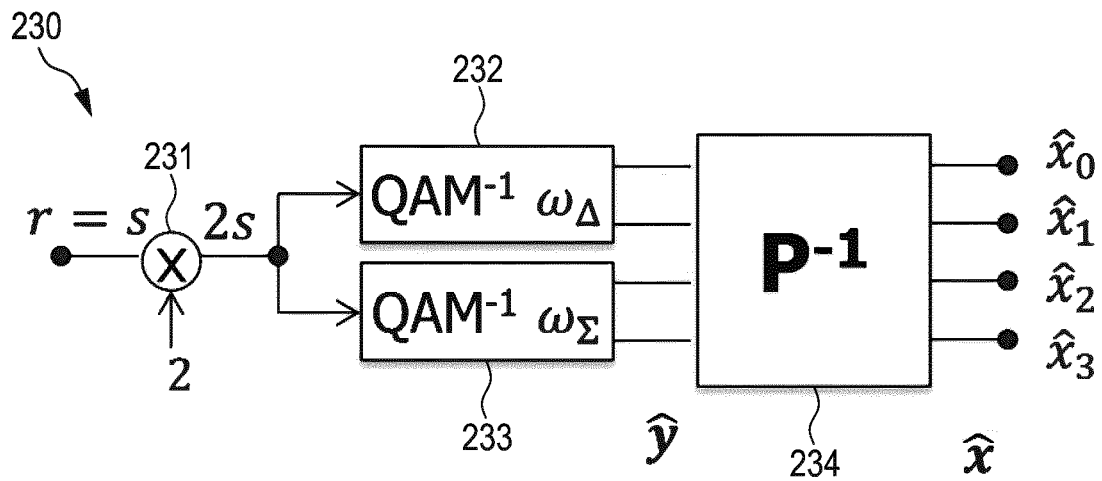
FIG. 9 shows a schematic diagram of another embodiment of a Quat-AM receiver.

FIG. 8 shows a schematic diagram of another embodiment of a Quat-AM transmitter 130 (i.e. of an embodiment of a first communication device 100 according to the present disclosure), also designated with $TX^a_{\Delta\Sigma}$. FIG. 9 shows a schematic diagram of another embodiment of a Quat-AM receiver 230 (i.e. of an embodiment of a second communication device 200 according to the present disclosure), also designated with $RX^a_{\Delta\Sigma}$.

FIG. 8 presents an alternative representation as two superimposed QAMs operating at $\omega_\Sigma$, and $\omega_\Delta$ applied in QAM modulators 132, 133. The QAMs are precoded by a precoder 131 using a four-dimensional matrix P. The optimum choice of the input components should be four-dimensional non-uniform constellations (NUCs), either before precoding using matrix P or after precoding using matrix P. The outputs of the QAM modulators 132, 133 are summed up in an adder 134 and multiplied by 0.5 by a multiplier 135 to obtain the output signal s.

If linear detection is used at the Quat-AM receiver 230 shown in FIG. 9, e.g. inverting the P matrix (ZF or MMSE) by an inverter 234 after QAM demodulation in QAM demodulators 232, 233 (receiving the signal 2s obtained from the receive signal s by multiplication of 2 by a multiplier 231), then the resulting four-dimensional signal, relating to the transmit signal $x_{0\,\ldots\,3}$, should be an optimum four-dimensional NUC. If ML or suboptimum forms thereof are used at the Quat-AM transmitter 130, the precoded signal $y_{0\,\ldots\,3}$ instead should be an optimum four-dimensional NUC.

In the embodiments shown in FIGS. 8 and 9 the following holds:

$$P = \begin{pmatrix} 1-\epsilon & \gamma_1 & \gamma_2 & \gamma_3 \\ 0 & -\alpha_1 + \beta_1 & -\alpha_2 + \beta_2 & -\alpha_3 + \beta_3 \\ 1+\epsilon & -\gamma_1 & -\gamma_2 & -\gamma_3 \\ 0 & -\alpha_1 - \beta_1 & -\alpha_2 - \beta_2 & -\alpha_3 - \beta_3 \end{pmatrix} = \begin{pmatrix} 1-\epsilon & \gamma^T \\ 0 & -\alpha^T + \beta^T \\ 1+\epsilon & -\gamma^T \\ 0 & -\alpha^T - \beta^T \end{pmatrix}.$$

Figure 10:
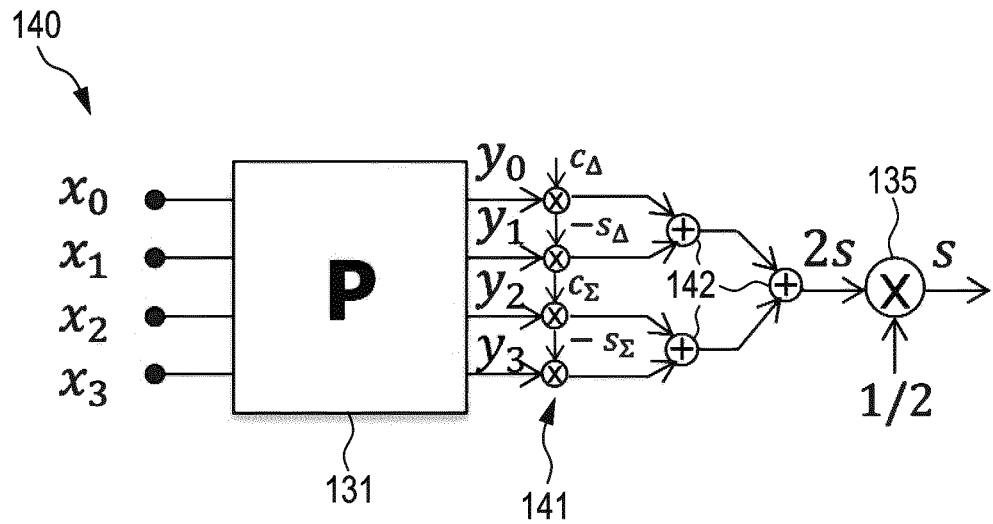
FIG. 10 shows a schematic diagram of another embodiment of a Quat-AM transmitter.
Figure 11:
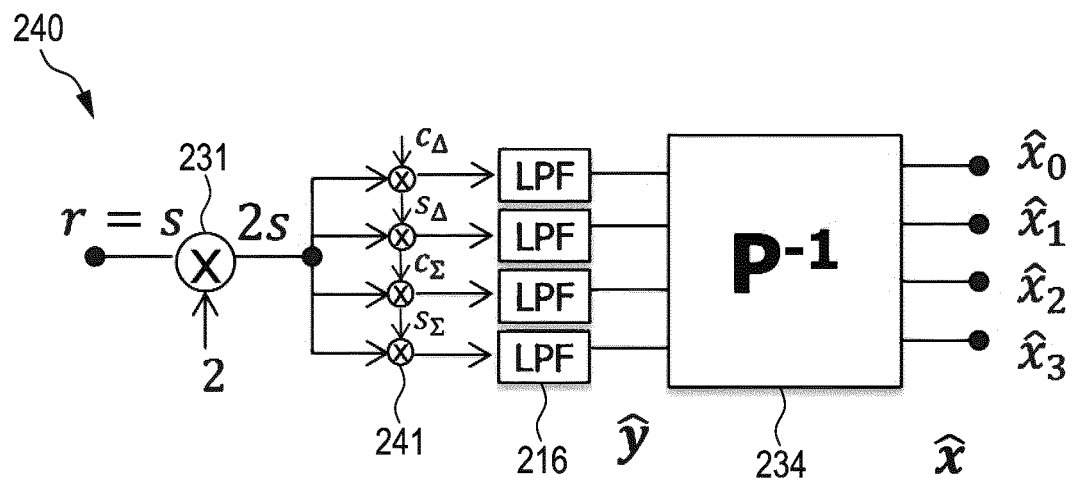
FIG. 11 shows a schematic diagram of another embodiment of a Quat-AM receiver.

To summarize the modulations for AM QAM and Quat-AM can mathematically be formulated as follows:
  AM: $a_0(t) \cdot \cos \omega_0 t$
  QAM: $a_0(t) \cdot \cos \omega_0 t - a_1(t) \cdot \sin \omega_0 t$
  Quat-AM: $a_0(t) \cdot \cos \omega_0 t \cdot \cos \omega_1 t + a_1(t) \cdot \cos \omega_0 t \cdot \sin \omega_1 t + a_2(t) \cdot \sin \omega_0 t \cdot \cos \omega_1 t + a_3(t) \cdot \sin \omega_0 t \cdot \sin \omega_1 t = b_0(t) \cdot \cos \omega_\Delta t - b_1(t) \cdot \sin \omega_\Delta t + b_2(t) \cdot \cos \omega_\Sigma t - b_3(t) \cdot \sin \omega_\Sigma t$ FIG. 10 shows a schematic diagram of an embodiment of a Quat-AM transmitter 140 representing a realization of the Quat-AM transmitter shown in FIG. 8 (i.e. of an embodiment of a first communication device 100 according to the present disclosure), also designated with $TX^b_{\Delta\Sigma}$. The two QAM modulators 132, 133 shown in FIG. 8 may be realized by multipliers with cosine and (negative) sine waveforms with frequencies $\omega_\Delta$ and $\omega_\Sigma$, respectively. In the same manner, FIG. 11 shows a schematic diagram of an embodiment of a Quat-AM receiver 240 representing a realization of the Quat-AM receiver shown in FIG. 9 (i.e. of an embodiment of a second communication device 200 according to the present disclosure, also designated with $RX^b_{\Delta\Sigma}$. The two QAM demodulators 232, 233 shown in FIG. 9 may be realized by multipliers with cosine and sine waveforms with frequencies $\omega_\Delta$ and $\omega_\Sigma$, respectively, followed by low-pass filters (LPF).

In the Quat-AM transmitter 140 the output signal $y_{0...3}$ of the precoder 131 are multiplied by cosine and (negative) sine waveforms with frequencies $\omega_\Delta$ and $\omega_\Sigma$, by multipliers 141. As introduced above in the description of FIG. 3, the following short-hand notation has been used: $c_v$=cos $((\omega_v t))$; $s_v$=sin $((\omega_v t))$; v ∈ {0,1,Δ,Σ}, e.g., $c_0$=cos $((\omega_0 t))$; $s_\Sigma$=sin $(\omega_\Sigma t)$. The results are then stepwise summed up by adders 142, before the multiplication by 0.5 is carried out by the multiplier 135. In the Quat-AM receiver 240 the inverse multiplications by cosine and sine waveforms with frequencies $\omega_\Delta$ and $\omega_\Sigma$, are carried out by multipliers 241, the results of which being subjected to LPF filtering by filters 216 and inversion by inverter 234.

Figure 12:
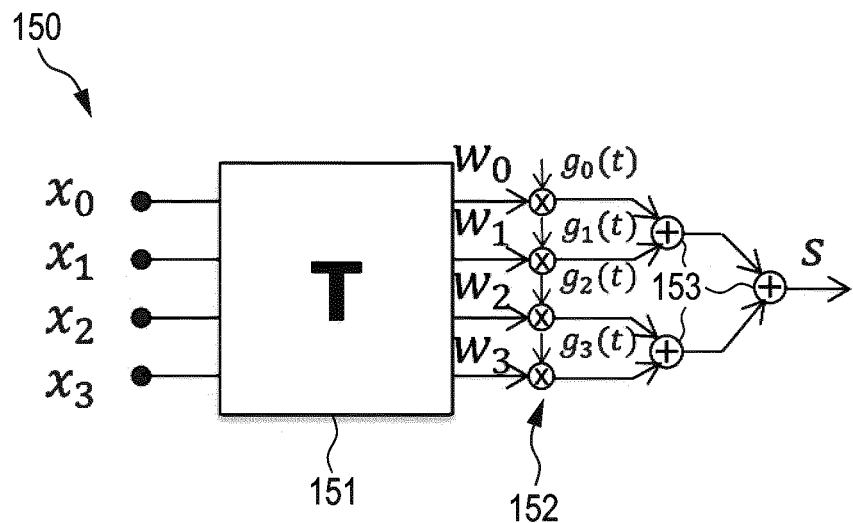
FIG. 12 shows a schematic diagram of another embodiment of a Quat-AM transmitter.

Quat-AM may alternatively be interpreted as using four orthogonal waveforms, consisting of mixed carriers (four cosine and sine product combinations at frequencies $f_0$ and $f_1$). A corresponding embodiment of a Quat-AM transmitter 150 (i.e. of an embodiment of a first communication device 100 according to the present disclosure), also designated with $TX_{o1,g}$, is shown in FIG. 12. Corresponding embodiments of a Quat-AM receiver 250, 255 (i.e. of embodiments of a second communication device 200 according to the present disclosure), also designated with $RX_{o1,g}$, and $RX_{o1,MF}$ are shown in FIGS. 13 and 14.

In the Quat-AM transmitter 150 shown in FIG. 12 the input signals $x_{0...3}$ are precoded by a matrix T by a precoder 151. The output signals $\omega_{0...3}$ are each multiplied by a respective orthogonal waveform signal $g_{0...3}(t)$ by multipliers 152. The results are then stepwise summed up by adders 153 to obtain the output signal s.

Figure 13:
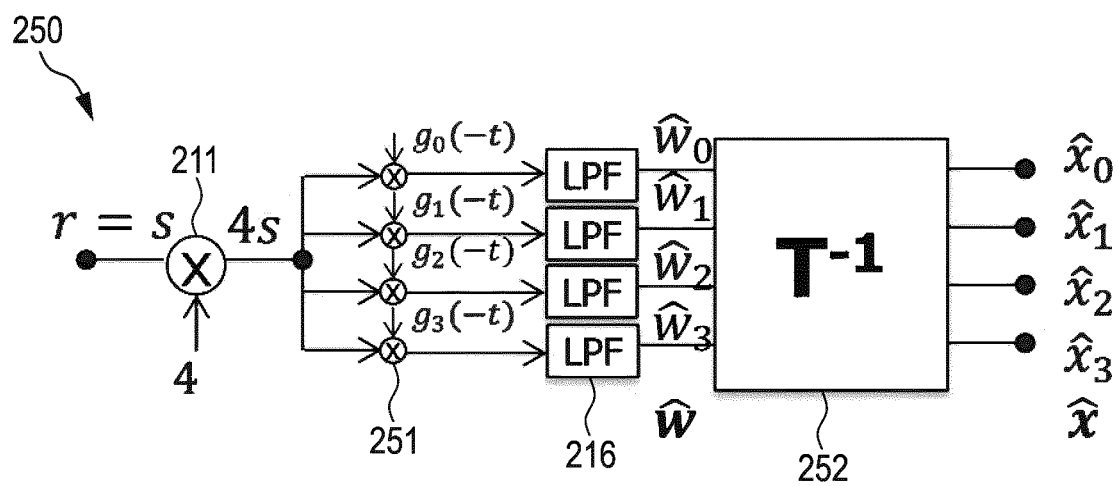
FIG. 13 shows a schematic diagram of another embodiment of a Quat-AM receiver.

In the Quat-AM receiver 250 shown in FIG. 13, the inverse multiplications by orthogonal waveform signals $g_{0...3}(-t)$ by multipliers 251 are carried out, the results of which being subjected to LPF filtering by filters 216 and inversion by inverter 252 using the inverse matrix $T^{-1}$. In the Quat-AM receiver 255 shown in FIG. 14, the received signal r multiplied by 4 is subjected to filtering by matched filters MF{$g_{0...3}(t)$} 256, the results of which are subject to inversion by inverter 252 using the inverse matrix $T^{-1}$.

Figure 14:
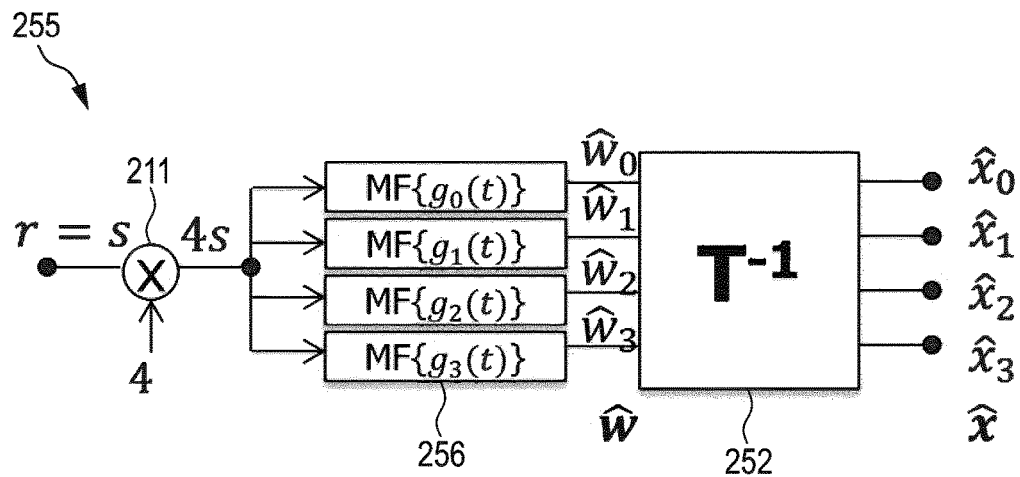
FIG. 14 shows a schematic diagram of another embodiment of a Quat-AM receiver.

In the embodiments shown in FIGS. 12-14 the following holds:

$$T = \begin{pmatrix} 1 & 0 & 0 & 0 \\ 0 & \beta_1 & \beta_2 & \beta_3 \\ 0 & \alpha_1 & \alpha_2 & \alpha_3 \\ -\epsilon & \gamma_1 & \gamma_2 & \gamma_2 \end{pmatrix} = \begin{pmatrix} 1 & 0^T \\ 0 & \beta^T \\ 0 & \alpha^T \\ -\epsilon & \gamma^T \end{pmatrix}.$$

The waveform signals are $$g_\mu(t) = \prod_{v=0}^{1} \cos\left(\omega_v t + \frac{\pi}{2} \cdot b_v^{(\mu)}\right)$$

with $b_v^{(\mu)}$ being $v^{th}$ bit of bin2dec($\mu$), e.g., $b_0^{(0)}$=0, $b_1^{(0)}$=0, $b_0^{(1)}$=0, $b_1^{(1)}$=1, $b_0^{(2)}$=1 $b_1^{(2)}$=0, . . . .

In more detail:

$g_0(t)$=cos($\omega_0 t$)·cos($\omega_1 t$)

$g_1(t)$=·cos($\omega_0 t$)·sin($\omega_1 t$)

$g_2(t)$=−sin($\omega_0 t$)·cos($\omega_1 t$)

$g_3(t)$=sin($\omega_0 t$)·sin($\omega_1 t$)

If $\alpha$=(0 1 0)$^T$;$\beta$=(1 0 0)$^T$→$\gamma$=(0 0 1)$^T$, then T=$I_4$, i.e., the identity matrix, which means that no precoding is needed.

Generally, the multiplication w=Tx means that the four components of w are derived from input x via matrix multiplication.

Figure 15:
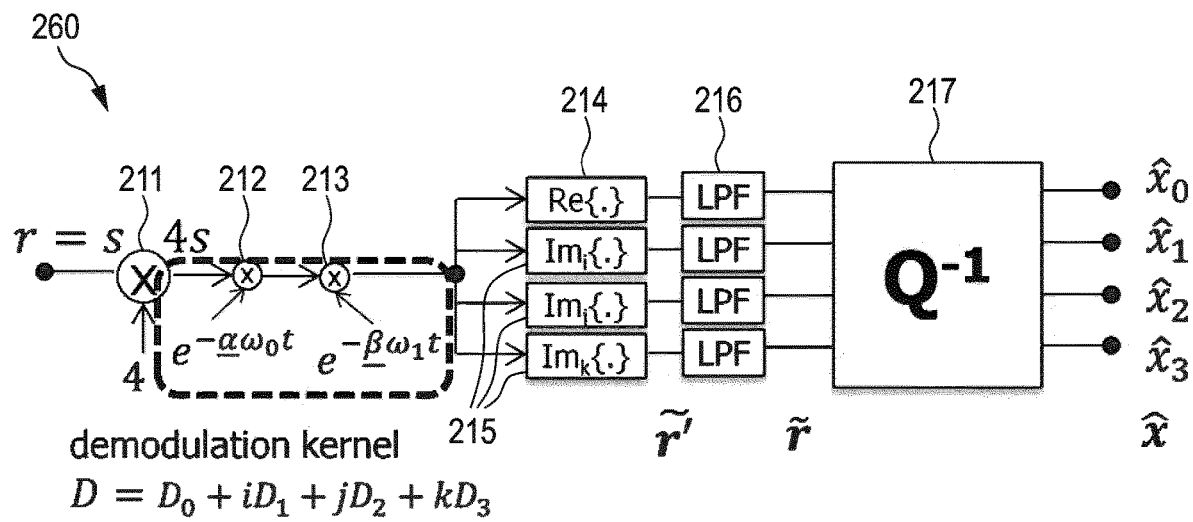
FIG. 15 shows a schematic diagram of another embodiment of a Quat-AM receiver.
Figure 16:
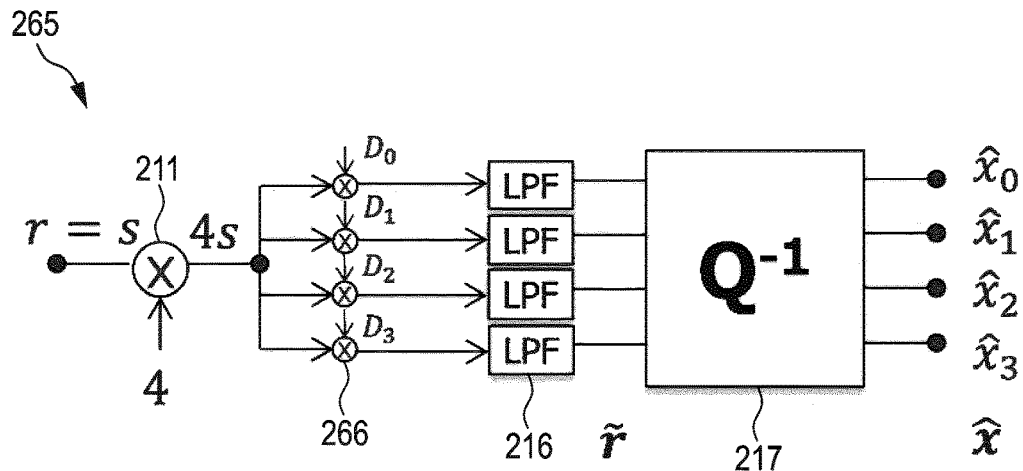
FIG. 16 shows a schematic diagram of another embodiment of a Quat-AM receiver.
Figure 17:
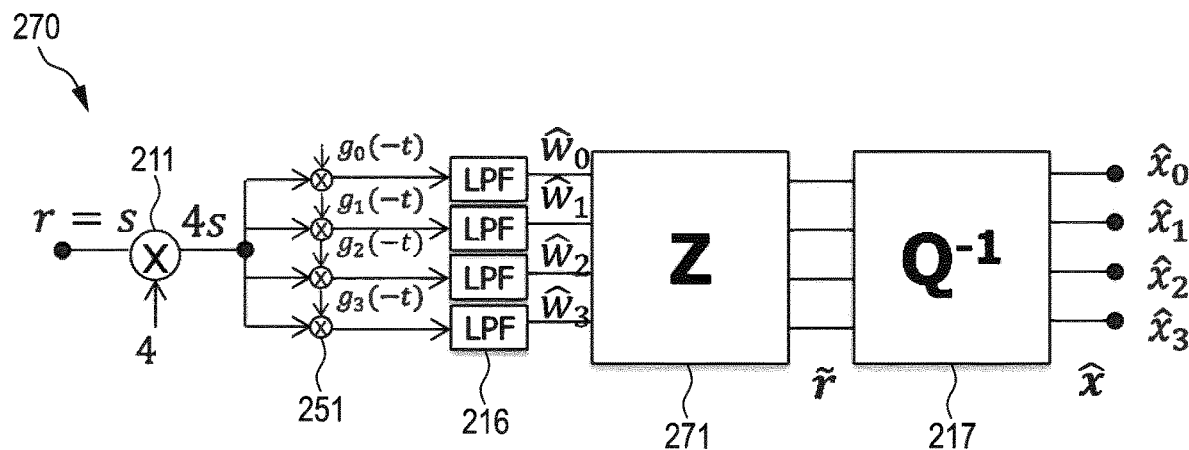
FIG. 17 shows a schematic diagram of another embodiment of a Quat-AM receiver.

FIGS. 15-17 show schematic diagrams of further embodiments of Quat-AM receivers 260, 265 and 270 (i.e. of embodiment of a second communication device 200 according to the present disclosure), also designated with $RX^a_{o1,q}$ (receiver 260), $RX^b_{o1,q}$ (receiver 265), or $RX^d_{o1,q}$ (receiver 270).

The Quat-AM receivers 260, 265, 270 shown in FIGS. 15-17 are based on the above described Quat-AM receiver 210 shown in FIG. 4, however having pre-calculated the contributions to the projections onto the four dimensions. The received input signal is real-valued, so that the projection onto the four dimensions does only depend on the demodulation kernel D.

The Quat-AM receiver 265 multiplies the received signal (multiplied by 4) with the kernel contributions $D_{0...3}$ by multipliers 266, before the results are subjected to LPF filtering and inversion using the inverse matrix $Q^{-1}$ by the matrix inverter 217.

The Quat-AM receiver 270 shows a relation to the four orthogonal waveforms" receiver 250 shown in FIG. 13. It applies a precoder 271 using a precoding matrix Z after LPF filtering and before matrix inversion.

In the embodiments shown in FIGS. 15-17 the following holds:

Demodulation kernel $D = D_0 + iD_1 + jD_2 + kD_3$ with $D_0 = c_0 c_1 - s_0 s_1 \epsilon$ and $D_\mu = -s_0 c_1 a_\mu - c_0 s_1 \beta_\mu + s_0 s_1 y_\mu$ for $\mu \in \{1,2,3\}$.

$$Z = \begin{pmatrix} 1 \\ 0 & 0 & 0 & -\epsilon \\ 0 & -\alpha & -\beta & \gamma \\ 0 \end{pmatrix}.$$

$Z' = (-\alpha \quad -\beta \quad \gamma)$.

$T^{-1} = ZQ^{-1} \rightarrow Z = T^{-1}Q$ and for $\alpha \perp \beta \rightarrow T^{-1} = Z$.

Figure 18:
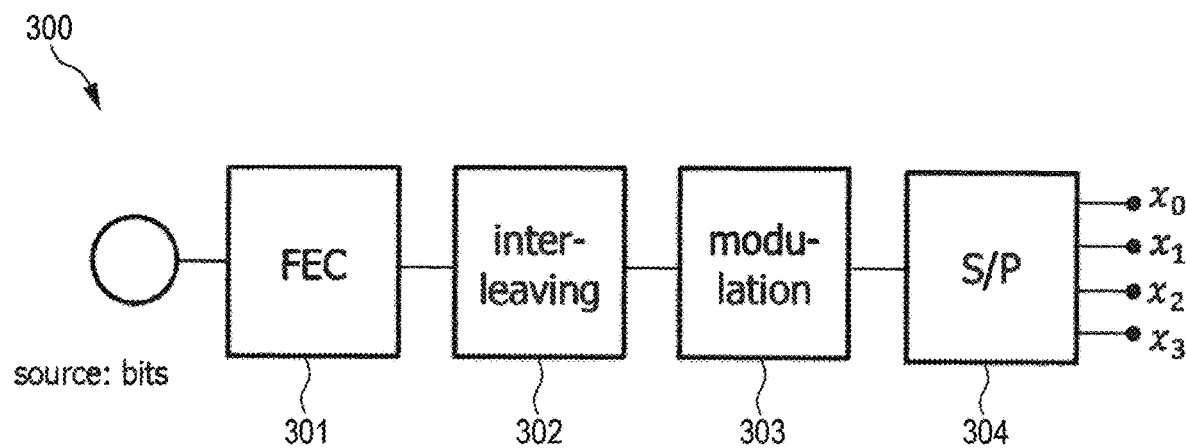
FIG. 18 shows a schematic diagram of a first embodiment of a generator 300 of a digital representation of the input signals.
Figure 19:
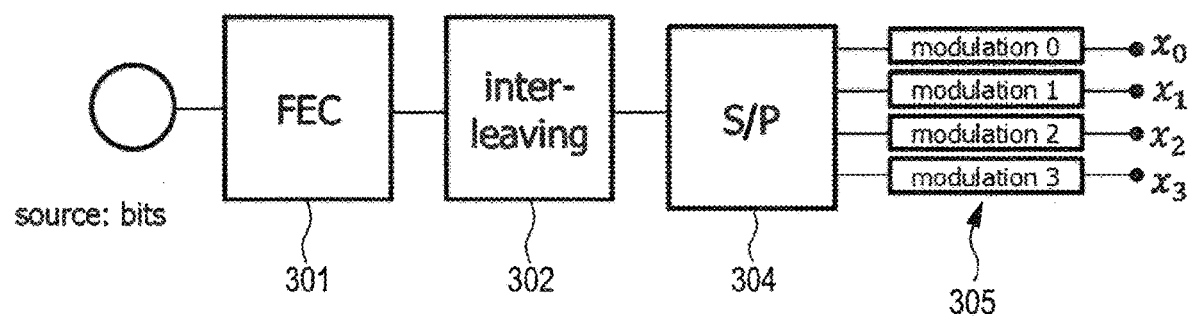
FIG. 19 shows a schematic diagram of a second embodiment of a generator 300 of a digital representation of the input signals.

So far, the input signals $x_{0...3}$ have been assumed to be in general analog signals with bandwidth $\omega_c$. They are then subjected to precoding by a precoder 131 or 151 as shown in FIGS. 8, 10 and 12. FIG. 18 shows a schematic diagram of a first embodiment of a generator 300 of a digital (discrete in both time and value) representation of the input signals $x_{0...3}$. The source bits are subjected to error correction in a FEC encoder 301, interleaving in an interleaver 302, modulation in a modulator 303 and serial-to-parallel conversion in a serial-to-parallel converter 304. FIG. 19 shows a schematic diagram of a second embodiment of a generator 300 of a digital representation of the input signals $x_{0...3}$, according to which each symbol $x_k$ may come from a different modulation scheme since the modulation is applied by modulators 305 per symbol $x_k$ after serial-to-parallel conversion.

Figure 20:
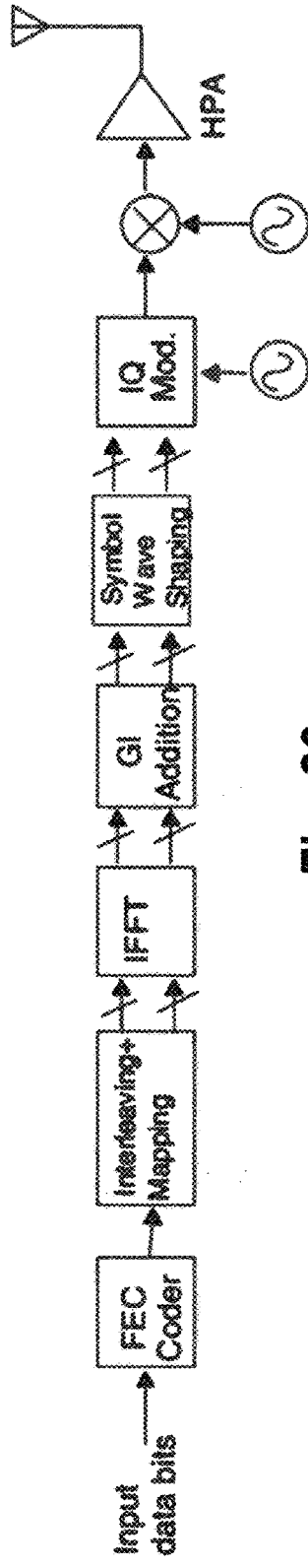
FIG. 20 shows a schematic diagram of a transmitter as described in IEEE802.11.
Figure 21:
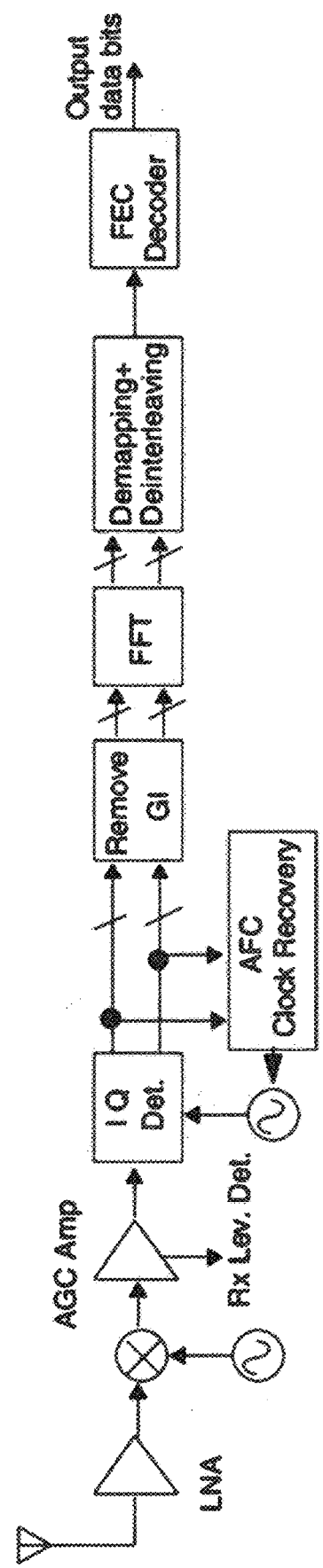
FIG. 21 shows a schematic diagram of a receiver as described in IEEE802.11.

FIGS. 20 and 21 show schematic diagrams of a transmitter 400 and a receiver 500 as described in IEEE802.11. The above-described disclosure of modulators, in particular Quat-AM modulators, may be applied in two such transmitters 400, when two different channels (channel bonding or channel aggregation) is used (instead of the independent IQ modulators) and receiver 500 (instead of the independent IQ determination). For conventional channel bonding/aggregation, two independent transmitters and receivers are used. In case of frequency selective fading, one of the channels may suffer severe attenuation or other effects (bursty frequency selective noise). In such cases, the information from the weaker channel is usually lost and needs to be retransmitted. In contrast, the modulators as disclosed herein combine the signals to be transmitted over two different channels. In the embodiment shown in FIG. 8 this is visualized by precoder matrix P. Thus, a weak channel (at angular carrier frequency $\omega_\Delta$ or $\omega_\Sigma$) will affect both complex signals (or all four real-valued signals $x_{0 \ldots 3}$, 130). The detrimental effect of selective fading is mitigated by averaging with the other less weaker channel. This frequency diversity effect is one of the main benefits of the present disclosure, resulting in diversity gains of up to 8 dB (as confirmed by simulation).

According to the present disclosure frequency diversity can be exploited by the novel modulation, in particular the novel Quat-AM modulation, since four independent signals are spread over two bands. Further, depending on the choice of the modulating quaternions $\underline{\alpha}$ and $\underline{\beta}$, new four-dimensional constellations can be formed. Analyzing the superimposed QAM structure, e.g., shows that the resulting constellations can form two-dimensional non-uniform constellations (NUCs), one NUC per QAM. For particular settings, even probabilistic amplitude shaping (PAS) can result from the Quat-AM structure. $\underline{\alpha}=i$ and $\underline{\beta}=j$ may be chosen, resulting in a mutated QAM for the upper QAM branch (operating at $\omega_\Delta$), in which points occur with different probabilities. Even though ambiguities arise, they are resolved with the second QAM. In simulations over fading channels, diversity gains up to 8 ... 9 dB have already been demonstrated.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits or circuitry. A circuit is a structural assemblage of electronic components including conventional circuit elements, integrated circuits including application specific integrated circuits, standard integrated circuits, application specific standard products, and field programmable gate arrays. Further, a circuit includes central processing units, graphics processing units, and microprocessors which are programmed or configured according to software code. A circuit does not include pure software, although a circuit includes the above-described hardware executing software. A circuit or circuitry may be implemented by a single device or unit or multiple devices or units, or chipset(s), or processor(s).

It follows a list of further embodiments of the disclosed subject matter:

1. Communication device comprising circuitry configured to
    modulate a four-dimensional input signal by combining the four real-valued signal components of the input signal into a transformed signal and multiplying the transformed signal by carrier signals using two different carrier frequencies to obtain a transmit signal, and
    transmit the transmit signal.

2. Communication device as defined in embodiment 1, wherein the circuitry is configured to combine the four real-valued signal components of the input signal into an input quaternion as transformed signal.

3. Communication device as defined in embodiment 2, wherein the circuitry is configured to interpret one of the four real-valued signal components as the real part of a quaternion-based transformed signal and to interpret the remaining three of the four real-valued signal components as the pure quaternion part of said quaternion-based transformed signal.

4. Communication device as defined in embodiment 2 or 3, wherein the circuitry is configured to multiply the transformed signal by a first quaternion phasor, as first carrier signal, using a first carrier frequency and to multiply the result of the first multiplication by a second quaternion phasor, as second carrier signal, using a second carrier frequency.

5. Communication device as defined in embodiment 4, wherein the circuitry is configured to multiply the transformed signal from one side by the first quaternion phasor and to multiply the result of the first multiplication from the other side by the second quaternion phasor.

6. Communication device as defined in embodiment 4 or 5, wherein the circuitry is configured to take a projection of the result of the second multiplication to any one of the four dimensions as transmit signal.

7. Communication device as defined in any one of the preceding embodiments, wherein the circuitry is configured to
    multiply the four-dimensional input signal by a four-dimensional precoding matrix to obtain a four-dimensional precoded signal,
    modulate the first two signal values of the four-dimensional precoded signal by a first QAM modulator using a frequency difference between the first carrier frequency and the second carrier frequency and the second two signal values of the four-dimensional precoded signal by a second QAM modulator using a frequency sum of the first carrier frequency and the second carrier frequency, and
    add the outputs of the first and second QAM modulators to obtain the transmit signal.

8. Communication device as defined in embodiment 7, wherein the circuitry is configured to use as four-dimensional precoding matrix the matrix $$P = \begin{pmatrix} 1-\epsilon & \gamma_1 & \gamma_2 & \gamma_3 \\ 0 & -\alpha_1+\beta_1 & -\alpha_2+\beta_2 & -\alpha_3+\beta_3 \\ 1+\epsilon & -\gamma_1 & -\gamma_2 & -\gamma_3 \\ 0 & -\alpha_1-\beta_1 & -\alpha_2-\beta_2 & -\alpha_3-\beta_3 \end{pmatrix} = \begin{pmatrix} 1-\epsilon & \gamma^T \\ 0 & -\alpha^T+\beta^T \\ 1+\epsilon & -\gamma^T \\ 0 & -\alpha^T-\beta^T \end{pmatrix},$$

wherein $\alpha = (\alpha_1 \alpha_2 \alpha_3)^T$;

$\beta = (\beta_1 \beta_2 \beta_3)^T$;

$\gamma = (\gamma_1 \gamma_2 \gamma_3)^T = \alpha \times \beta$;

$\epsilon = \langle \alpha, \beta \rangle = \sum_{v=1}^{3} \alpha_v \beta_v$;

$|\alpha| = |\beta| = 1$, and
wherein α and β are quaternions from first and second quaternion phasors, respectively.

9. Communication device as defined in embodiment 8, wherein α and β are not parallel.

10. Communication device as defined in any one of the preceding embodiments, wherein the circuitry is configured to
multiply the four-dimensional input signal by a four-dimensional precoding matrix to obtain a four-dimensional precoded signal,
multiply each of the four signal values of the four-dimensional precoded signal by a different waveform signal, and
add the output of second multiplication to obtain the transmit signal.

11. Communication device as defined in embodiment 10, wherein the four waveform signals used for multiplying each of the four signal values of the four-dimensional precoded signal are four combinations of products of cosine and sine carriers at the two carrier frequencies.

12. Communication device as defined in embodiment 10, wherein the circuitry is configured to use as four-dimensional precoding matrix the matrix $$T = \begin{pmatrix} 1 & 0 & 0 & 0 \\ 0 & \beta_1 & \beta_2 & \beta_3 \\ 0 & \alpha_1 & \alpha_2 & \alpha_3 \\ -\epsilon & \gamma_1 & \gamma_2 & \gamma_2 \end{pmatrix} = \begin{pmatrix} 1 & 0^T \\ 0 & \beta^T \\ 0 & \alpha^T \\ -\epsilon & \gamma^T \end{pmatrix},$$

wherein $\alpha = (\alpha_1 \alpha_2 \alpha_3)^T$;

$\beta = (\beta_1 \beta_2 \beta_3)^T$;

$\gamma = (\gamma_1 \gamma_2 \gamma_3)^T = \alpha \times \beta$;

$\epsilon = \langle \alpha, \beta \rangle = \sum_{v=1}^{3} \alpha_v \beta_v$;

$|\alpha| = |\beta| = 1$, and
wherein α and β are quaternions from first and second quaternion phasors, respectively.

13. Communication device as defined in embodiment 10, wherein the circuitry is configured to use as carrier signals products of cosine and sine carriers at the two carrier frequencies.

14. Communication device as defined in any one of the preceding embodiments, wherein the two different carrier frequencies are larger than a cutoff frequency of each of the four real-valued signal components of the input signal.

15. Communication device as defined in any one of the preceding embodiments, wherein the absolute value of the difference of the two different carrier frequencies is larger than the cutoff frequency each of the four real-valued signal components of the input signal.

16. Communication device as defined in any one of the preceding embodiments, wherein the difference of the two different carrier frequencies is zero.

17. Communication device as defined in any one of the preceding embodiments, wherein the circuitry is configured to apply a quaternary modulation of four input signals to generate a real-valued output signal based on a transformation, which is fully defined by two three-dimensional vectors $\alpha=(\alpha_1 \alpha_2 \alpha_3)^T$ and $\beta=(\beta_1 \beta_2 \beta_3)^T$.

18. Communication device as defined in any one of the preceding embodiments, wherein the circuitry is configured to perform the modulation by quaternion-based multiplications by
treating the input signal as input quaternion,
multiplying said input quaternion from left-side with quaternion $e^{\alpha \omega_0 t}$,
multiplying the result from right-side with quaternion $e^{\beta \omega_1 t}$, and
projecting the result to any of the four dimensions.

19. Communication device as defined in any one of the preceding embodiments, wherein the circuitry is configured to perform the modulation by linear transformation of four input signals with a P matrix,
wherein said P matrix is defined as $$P = \begin{pmatrix} 1-\epsilon & \gamma_1 & \gamma_2 & \gamma_3 \\ 0 & -\alpha_1+\beta_1 & -\alpha_2+\beta_2 & -\alpha_3+\beta_3 \\ 1+\epsilon & -\gamma_1 & -\gamma_2 & -\gamma_3 \\ 0 & -\alpha_1-\beta_1 & -\alpha_2-\beta_2 & -\alpha_3-\beta_3 \end{pmatrix} = \begin{pmatrix} 1-\epsilon & \gamma^T \\ 0 & -\alpha^T+\beta^T \\ 1+\epsilon & -\gamma^T \\ 0 & -\alpha^T-\beta^T \end{pmatrix},$$

and
wherein the result of the transformation is processed by two QAM modulation schemes with carrier frequencies $\omega_\Sigma=\omega_0+\omega_1$ and $\omega_\Delta=\omega_0-\omega_1$.

20. Communication device comprising circuitry configured to
receive a transmit signal, and
demodulate the transmit signal into a four-dimensional output signal by multiplying the transmit signal by carrier signals using two different carrier frequencies to obtain a retransformed signal and decomposing the retransformed signal into the four real-valued signal components of the output signal.

21. Communication device as defined in embodiment 20, wherein the circuitry is configured to decompose an output quaternion as retransformed signal into the four real-valued signal components of the output signal.

22. Communication device as defined in embodiment 21, wherein the circuitry is configured to interpret one of the four real-valued signal components as the real part of a quaternion-based retransformed signal and to interpret the remaining three of the four real-valued signal components as the pure quaternion part of said quaternion-based retransformed signal.

23. Communication device as defined in embodiment 21 or 22,
wherein the circuitry is configured to multiply the transmit signal by a first quaternion phasor, as first carrier signal, using a first carrier frequency and to multiply the result of the first multiplication by a second quaternion phasor, as second carrier signal, using a second carrier frequency.

24. Communication device as defined in embodiment 23,
wherein the circuitry is configured to multiply the transmit signal from one side by the first quaternion phasor and to multiply the result of the first multiplication from the other side by the second quaternion phasor.

25. Communication device as defined in any one of embodiments 20 to 24,
wherein the circuitry is configured to
demodulate the transmit signal by a first QAM demodulator using a frequency difference between the first carrier frequency and the second carrier frequency and by a second QAM demodulator using a frequency sum of the first carrier frequency and the second carrier frequency, and
multiply the output of the first and second QAM demodulator by the inverse of a four-dimensional precoding matrix to obtain a four-dimensional output signal.

26. Communication device as defined in embodiment 25,
wherein the circuitry is configured to use as four-dimensional precoding matrix the matrix $$P = \begin{pmatrix} 1-\epsilon & \gamma_1 & \gamma_2 & \gamma_3 \\ 0 & -\alpha_1+\beta_1 & -\alpha_2+\beta_2 & -\alpha_3+\beta_3 \\ 1+\epsilon & -\gamma_1 & -\gamma_2 & -\gamma_3 \\ 0 & -\alpha_1-\beta_1 & -\alpha_2-\beta_2 & -\alpha_3-\beta_3 \end{pmatrix} = \begin{pmatrix} 1-\epsilon & \gamma^T \\ 0 & -\alpha^T+\beta^T \\ 1+\epsilon & -\gamma^T \\ 0 & -\alpha^T-\beta^T \end{pmatrix},$$

wherein $\alpha = (\alpha_1\alpha_2\alpha_3)^T$;

$\beta = (\beta_1\beta_2\beta_3)^T$;

$\gamma = (\gamma_1\gamma_2\gamma_3)^T = \alpha \times \beta$;

$\epsilon = \langle \alpha, \beta \rangle = \sum_{v=1}^{3} \alpha_v \beta_v$;

$|\alpha| = |\beta| = 1$, and
wherein α and β are quaternions from first and second quaternion phasors, respectively.

26. Communication device as defined in embodiment 25, wherein α and β are not parallel.

27. Communication device as defined in any one of embodiments 20 to 26, wherein the circuitry is configured to
multiply the transmit signal, in parallel, by each four different waveform signals, and
multiply the result by the inverse of a four-dimensional precoding matrix to obtain a four-dimensional output signal.

28. Communication device as defined in embodiment 27,
wherein the four waveform signals are four combinations of products of cosine and sine carriers at the two carrier frequencies.

29. Communication device as defined in embodiment 27 or 28,
wherein the circuitry is configured to use as four-dimensional precoding matrix the matrix $$T = \begin{pmatrix} 1 & 0 & 0 & 0 \\ 0 & \beta_1 & \beta_2 & \beta_3 \\ 0 & \alpha_1 & \alpha_2 & \alpha_3 \\ -\epsilon & \gamma_1 & \gamma_2 & \gamma_2 \end{pmatrix} = \begin{pmatrix} 1 & 0^T \\ 0 & \beta^T \\ 0 & \alpha^T \\ -\epsilon & \gamma^T \end{pmatrix},$$

wherein $\alpha = (\alpha_1\alpha_2\alpha_3)^T$;

$\beta = (\beta_1\beta_2\beta_3)^T$;

$\gamma = (\gamma_1\gamma_2\gamma_3)^T = \alpha \times \beta$;

$\epsilon = \langle \alpha, \beta \rangle = \sum_{v=1}^{3} \alpha_v \beta_v$;

$|\alpha| = |\beta| = 1$, and
wherein α and β are quaternions from first and second quaternion phasors, respectively.

30. Communication device as defined in embodiment 27, 28 or 29,
wherein the circuitry is configured to use as carrier signals products of cosine and sine carriers at the two carrier frequencies.

31. Communication device as defined in any one of the preceding embodiments 20 to 30,
wherein the two different carrier frequencies are larger than a cutoff frequency of each of the four real-valued signal components of the input signal.

32. Communication device as defined in any one of the embodiments 20 to 31, wherein the absolute value of the difference of the two different carrier frequencies is larger than the cutoff frequency each of the four real-valued signal components of the input signal.

33. Communication device as defined in any one of the preceding embodiments 20 to 32,
wherein the difference of the two different carrier frequencies is zero.

34. Communication device as defined in embodiment 26,
wherein the result of the demodulation is processed by two QAM modulation schemes with carrier frequencies $\omega_\Sigma = \omega_0 + \omega_1$ and $\omega_\Delta = \omega_0 - \omega_1$.

35. Communication method comprising:
modulating a four-dimensional input signal by combining the four real-valued signal components of the input signal into a transformed signal and multiplying the transformed signal by carrier signals using two different carrier frequencies to obtain a transmit signal, and
transmitting the transmit signal.

36. Communication method comprising:
receiving a transmit signal, and
demodulating the transmit signal into a four-dimensional output signal by multiplying the transmit signal by carrier signals using two different carrier frequencies to obtain a retransformed signal and decomposing the retransformed signal into the four real-valued signal components of the output signal.

37. A non-transitory computer-readable recording medium that stores therein a computer program product, which, when executed by a processor, causes the method according to embodiment 35 or 36 to be performed.

38. A computer program comprising program code means for causing a computer to perform the steps of said method according to embodiment 35 or 36 when said computer program is carried out on a computer.

The invention claimed is:

1. A communication device comprising circuitry configured to
modulate a four-dimensional input signal by combining four real-valued signal components of the four-dimensional input signal into a transformed signal and multiplying the transformed signal by carrier signals using two different carrier frequencies to obtain a transmit signal, and
transmit the transmit signal.

2. The communication device as claimed in claim 1, wherein the circuitry is further configured to combine the four real-valued signal components of the four-dimensional input signal into an input quaternion as the transformed signal.

3. The communication device as claimed in claim 2, wherein the circuitry is further configured to interpret one of the four real-valued signal components as a real part of a quaternion-based transformed signal and to interpret the remaining three of the four real-valued signal components as a pure quaternion part of said quaternion-based transformed signal.

4. The communication device as claimed in claim 2, wherein the circuitry is further configured to multiply the transformed signal by a first quaternion phasor, as a first carrier signal of the carrier signals, using a first carrier frequency of the two different carrier frequencies to produce a first multiplication result and to multiply the first multiplication result by a second quaternion phasor, as a second carrier signal of the carrier signals, using a second carrier frequency of the two different carrier frequencies to produce a second multiplication result.

5. The communication device as claimed in claim 4, wherein the circuitry is further configured to take a projection of the second multiplication result to any one of the four dimensions as the transmit signal.

6. The communication device as claimed in claim 1, wherein the circuitry is further configured to
multiply the four-dimensional input signal by a four-dimensional precoding matrix to obtain a four-dimensional precoded signal,
modulate first two signal values of the four-dimensional precoded signal by a first quadrature amplitude modulation (QAM) modulator using a frequency difference between a first carrier frequency of the two different carrier frequencies and a second carrier frequency of the two different carrier frequencies and second two signal values of the four-dimensional precoded signal by a second QAM modulator using a frequency sum of the first carrier frequency and the second carrier frequency, and
add respective outputs of the first and second QAM modulators to obtain the transmit signal.

7. The communication device as claimed in claim 6, wherein the circuitry is further configured to use as the four-dimensional precoding matrix a matrix $$P = \begin{pmatrix} 1-\epsilon & \gamma_1 & \gamma_2 & \gamma_3 \\ 0 & -\alpha_1+\beta_1 & -\alpha_2+\beta_2 & -\alpha_3+\beta_3 \\ 1+\epsilon & -\gamma_1 & -\gamma_2 & -\gamma_3 \\ 0 & -\alpha_1-\beta_1 & -\alpha_2-\beta_2 & -\alpha_3-\beta_3 \end{pmatrix} = \begin{pmatrix} 1-\epsilon & \gamma^T \\ 0 & -\alpha^T+\beta^T \\ 1+\epsilon & -\gamma^T \\ 0 & -\alpha^T-\beta^T \end{pmatrix},$$

wherein $\alpha = (\alpha_1\alpha_2\alpha_3)^T$;

$\beta = (\beta_1\beta_2\beta_3)^T$;

$\gamma = (\gamma_1\gamma_2\gamma_3)^T = \alpha \times \beta$;

$\epsilon = \langle \alpha, \beta \rangle = \sum_{v=1}^{3} \alpha_v \beta_v$;

$|\alpha| = |\beta| = 1$, and
wherein $\alpha$ and $\beta$ are quaternions from first and second quaternion phasors, respectively.

8. The communication device as claimed in claim 7, wherein $\alpha$ and $\beta$ are not parallel.

9. The communication device as claimed in claim 1, wherein the circuitry is configured to
multiply the four-dimensional input signal by a four-dimensional precoding matrix to obtain a four-dimensional precoded signal, wherein the four-dimensional precoded signal includes four signal values,
multiply each of the four signal values of the four-dimensional precoded signal by a different waveform signal, and
add the four signal values after multiplication to obtain the transmit signal.

10. The communication device as claimed in claim 9, wherein the four different waveform signals used for multiplying the four signal values of the four-dimensional precoded signal are four combinations of products of cosine and sine carriers at the two carrier frequencies.

11. The communication device as claimed in claim 9, wherein the circuitry is further configured to use as the four-dimensional precoding matrix a matrix $$T = \begin{pmatrix} 1 & 0 & 0 & 0 \\ 0 & \beta_1 & \beta_2 & \beta_3 \\ 0 & \alpha_1 & \alpha_2 & \alpha_3 \\ -\epsilon & \gamma_1 & \gamma_2 & \gamma_2 \end{pmatrix} = \begin{pmatrix} 1 & 0^T \\ 0 & \beta^T \\ 0 & \alpha^T \\ -\epsilon & \gamma^T \end{pmatrix},$$

wherein $\alpha = (\alpha_1\alpha_2\alpha_3)^T$;

$\beta = (\beta_1\beta_2\beta_3)^T$;

$\gamma = (\gamma_1\gamma_2\gamma_3)^T = \alpha \times \beta$;

$\epsilon = \langle \alpha, \beta \rangle = \sum_{v=1}^{3} \alpha_v \beta_v$;

$|\alpha| = |\beta| = 1$, and
wherein $\alpha$ and $\beta$ are quaternions from first and second quaternion phasors, respectively.

12. The communication device as claimed in claim 9, wherein the circuitry is further configured to use as the carrier signals products of cosine and sine carriers at the two different carrier frequencies.

13. The communication device as claimed in claim 1, wherein the two different carrier frequencies are larger than a cutoff frequency of each of the four real-valued signal components of the four-dimensional input signal.

14. The communication device as claimed in claim 1, wherein an absolute value of a difference of the two different carrier frequencies is larger than a cutoff frequency of each of the four real-valued signal components of the four-dimensional input signal.

15. The communication device as claimed in claim 1, wherein a difference of the two different carrier frequencies is zero.

16. A communication device comprising circuitry configured to
    receive a transmit signal, and
    demodulate the transmit signal into a four-dimensional output signal by multiplying the transmit signal by carrier signals using two different carrier frequencies to obtain a retransformed signal and decomposing the retransformed signal into four real-valued signal components of the four-dimensional output signal.

17. A communication method comprising:
    modulating a four-dimensional input signal by combining four real-valued signal components of the four-dimensional input signal into a transformed signal and multiplying the transformed signal by carrier signals using two different carrier frequencies to obtain a transmit signal, and
    transmitting the transmit signal.

18. A communication method comprising:
    receiving a transmit signal, and
    demodulating the transmit signal into a four-dimensional output signal by multiplying the transmit signal by carrier signals using two different carrier frequencies to obtain a retransformed signal and decomposing the retransformed signal into four real-valued signal components of the four-dimensional output signal.

19. A non-transitory computer-readable recording medium that stores therein a computer program product, which, when executed by a processor, causes the processor to perform the method according to claim 17 or claim 18.

* * * * *